United States Patent
Breese et al.

[11] Patent Number: 5,983,497
[45] Date of Patent: Nov. 16, 1999

[54] METHOD FOR FORMING A VEHICLE DRIVESHAFT TUBE

[75] Inventors: Douglas E. Breese, Northwood; Philip A. Eversole, Toledo, both of Ohio

[73] Assignee: Dana Corporation, Toledo, Ohio

[21] Appl. No.: 08/995,304

[22] Filed: Dec. 22, 1997

[51] Int. Cl.⁶ .................................................. B23P 15/12
[52] U.S. Cl. ...................... 29/897.2; 29/401.1; 464/180
[58] Field of Search .................. 29/897.2, 401.1; 464/180, 183, 179; 72/370.25, 370.24, 370.23

[56] References Cited

U.S. PATENT DOCUMENTS

| | | | |
|---|---|---|---|
| 2,133,091 | 10/1938 | Gettig | 29/153 |
| 4,669,999 | 6/1987 | Miller . | |
| 4,747,799 | 5/1988 | Kato | 464/180 |
| 4,820,241 | 4/1989 | Nakamura . | |
| 4,892,433 | 1/1990 | Schreiber . | |
| 4,932,280 | 6/1990 | Becker et al. . | |
| 4,943,263 | 7/1990 | Zyogahara et al. | 464/180 |
| 5,243,880 | 9/1993 | Beier et al. . | |
| 5,287,768 | 2/1994 | Amborn et al. . | |
| 5,346,432 | 9/1994 | Greulich et al. . | |
| 5,354,237 | 10/1994 | Amborn et al. | 464/180 |
| 5,397,272 | 3/1995 | Smiley et al. | 464/183 |
| 5,566,777 | 10/1996 | Trommer et al. . | |
| 5,593,144 | 1/1997 | Hamada et al. | 464/180 |
| 5,637,042 | 6/1997 | Breese | 464/183 |

*Primary Examiner*—Irene Cuda
*Assistant Examiner*—Trinh T. Nguyen
*Attorney, Agent, or Firm*—MacMillan, Sobanski & Todd, LLC

[57] ABSTRACT

A method for forming an enlarged diameter aluminum alloy driveshaft tube having an interior reduced diameter portion that avoids clearance issues with respect to other components of the vehicle includes the initial step of providing a tube of aluminum alloy material having a diameter that corresponds to the enlarged diameter of the driveshaft tube to be formed. Then, a determination is made as to whether any component of the vehicle is located sufficiently close to the driveshaft tube to interfere with the rotation thereof during normal operation. If so, the position and axial length of the potential interference is located on the aluminum alloy tube. A diameter reducing process is then performed on the aluminum alloy tube to form the interior reduced diameter portion to eliminate the potential interference. Next, the ends of the enlarged diameter tube may be reduced if desired, such as by swaging, to form the driveshaft tube having the first and second diameter reducing portions at the ends thereof If desired, the step of forming the first and second diameter reducing portions can precede or occur simultaneously with the step of forming the interior reduced diameter portion. To complete the method of this invention, yokes are secured to the reduced diameter end portions of the driveshaft tube, and the driveshaft tube is installed in the drive train system of the vehicle.

10 Claims, 3 Drawing Sheets

METHOD FOR FORMING A VEHICLE DRIVESHAFT TUBE

BACKGROUND OF THE INVENTION

This invention relates in general to drive train systems for transferring rotational power from an engine to the driven wheels of a vehicle. In particular, this invention relates to an improved method for forming a driveshaft tube for use in such a vehicle drive train system.

In most land vehicles in use today, a drive train system is provided for transmitting power from a source of rotational power, such as an internal combustion or diesel engine, to a plurality of driven wheels of the vehicle. A typical drive train system includes a clutch, a transmission, a driveshaft assembly, and an axle assembly which are connected in series between the engine and the driven wheels of the vehicle. The clutch is connected to the output shaft of the engine for selectively providing a driving connection therethrough to the input shaft of the transmission. The transmission provides a plurality of gear ratios between the input shaft and an output shaft connected to the forward end of the driveshaft assembly. The driveshaft assembly is elongated so as to transmit the rotational power from the transmission to the vicinity of the driven wheels of the vehicle. The axle assembly includes an input shaft that is connected to the rearward end of the driveshaft assembly, a differential gear mechanism that is rotatably driven by the input shaft, and a pair of output axle shafts that connect the differential gear mechanism to the driven wheels of the vehicle.

Usually, the output shaft of the transmission and the input shaft of the axle assembly are not co-axially aligned with one another. To accommodate this, a typical driveshaft assembly includes an elongated driveshaft tube having a pair of universal joints secured to the ends thereof. The first universal joint is connected to the output shaft of the transmission, while the second universal joint is connected to the input shaft of the axle assembly. The universal joints provide a rotational driving connection from the output shaft of the transmission through the driveshaft tube to the input shaft of the axle assembly, while accommodating a limited amount of angular misalignment therebetween. Thus, it can be seen that the weight of the driveshaft assembly is supported at its forward end by the output shaft of the transmission and at its rearward end by the input shaft of the axle assembly.

Traditionally, driveshaft tubes have been formed from steel alloys having a constant diameter throughout the entire length thereof. Steel alloys are relatively high strength materials. Thus, for a given torque load requirement in a vehicle, a steel alloy driveshaft tube can be formed having a relatively small diameter. For example, in many light trucks and similar vehicles, conventional steel alloy driveshaft tubes have been formed having a diameter of approximately three to three and one-half inches. Unfortunately, steel alloys are also relatively heavy materials. As mentioned above, the weight of the driveshaft assembly is supported at its forward end by the output shaft of the transmission and at its rearward end by the input shaft of the axle assembly. Thus, care must be taken to insure that the weight of the driveshaft assembly can be adequately supported by the transmission bearings that rotatably support the output shaft of the transmission and the axle bearings that rotatably support the input shaft of the axle assembly.

In some vehicles, the distance between the output shaft of the transmission and the input shaft of the axle assembly is relatively small. In those vehicles, the weight of a single elongated driveshaft tube formed from a steel alloy material can be adequately carried by the transmission and axle bearings. However, in other vehicles, the distance between the output shaft of the transmission and the input shaft of the axle is relatively large. It has been found that the weight of a single elongated driveshaft tube formed from a steel alloy material places an undesirably large load on the transmission and axle bearings. In those instances, it is known to split a single elongated driveshaft tube formed from a steel alloy material into a pair of relatively short driveshaft tube sections that are themselves connected together by a third universal joint. A center bearing assembly is provided to support the weight of the interior ends of the two driveshaft sections on the frame of the vehicle, while allowing relative rotation thereof. This structure has been found to sufficiently reduce the amount of weight placed upon the transmission and axle bearings to an acceptable level. However, this structure adds undesirable cost and complexity to the structure and installation of the driveshaft assembly.

Recently, there has been a movement to form driveshaft tubes from alloys of aluminum, as opposed to steel. Aluminum alloys are both strong and lightweight and, therefore, are usually regarding as desirable substitutes for steel alloys in driveshaft tubes. Thus, the weight of a single elongated driveshaft tube formed from an aluminum alloy material is much lighter that a comparably sized driveshaft tube formed from a steel alloy material. Accordingly, a single elongated driveshaft tube formed from an aluminum alloy material can be used in lieu of a split driveshaft assembly structure formed from a steel alloy material (including the third universal joint and center bearing assembly discussed above) without placing an undesirably large load on the transmission and axle bearings.

However, it has been found that an aluminum alloy driveshaft tube having a diameter that is comparable to the diameter of a corresponding steel alloy driveshaft tube tends to vibrate when the vehicle is driven at normal operating speeds. Such vibrations are undesirable because they generate noise. To address this, it has been found desirable to form aluminum alloy driveshaft tubes having a diameter that is somewhat larger than the diameter of a corresponding conventional steel driveshaft tube. For example, in a vehicle drive train system including a steel alloy driveshaft tube having a diameter of approximately three to three and one-half inches, it has been found acceptable to substitute an aluminum alloy driveshaft tube having a diameter of approximately five inches. The larger diameter aluminum alloy driveshaft tube does not vibrate when the vehicle is driven at normal operating speeds.

In some vehicles, the physical space allocated for the driveshaft assembly is sufficiently large to permit the preferred enlarged diameter aluminum alloy driveshaft tubes to be substituted for the conventional steel driveshaft tubes without any modifications to the vehicle itself. Unfortunately, in other vehicles, it has been found that the enlarged physical space occupied by the preferred enlarged diameter aluminum alloy driveshaft tubes causes clearance issues with respect to other components of the vehicle. Obviously, it would be quite time consuming and expensive to modify the structures of such vehicles to accommodate the enlarged physical space occupied by the preferred enlarged diameter aluminum alloy driveshaft tubes. Thus, it would be desirable to provide an improved method for forming an enlarged diameter aluminum alloy driveshaft tube that avoids clearance issues with respect to other components of the vehicle.

SUMMARY OF THE INVENTION

This invention relates to an improved method for forming an enlarged diameter aluminum alloy driveshaft tube that avoids clearance issues with respect to other components of the vehicle. First, a tube of aluminum alloy material is provided having a diameter that corresponds to the enlarged diameter of the driveshaft tube to be formed. Then, a determination is made as to whether any component of the vehicle is located sufficiently close to the driveshaft tube to interfere with the rotation thereof during normal operation. If so, the position and axial length of the potential interference is located on the aluminum alloy tube. A diameter reducing process is then performed on the aluminum alloy tube to form the interior reduced diameter portion to eliminate the potential interference. Next, the ends of the enlarged diameter tube may be reduced, such as by swaging, to form the driveshaft tube having the first and second diameter reducing portions at the ends thereof. If desired, the step of forming the first and second diameter reducing portions can precede or occur simultaneously with the step of forming the interior reduced diameter portion. To complete the method of this invention, yokes are secured to the end portions of the driveshaft tube, and the driveshaft tube is installed in the drive train system of the vehicle.

Various objects and advantages of this invention will become apparent to those skilled in the art from the following detailed description of the preferred embodiment, when read in light of the accompanying drawings. dr

DETAILED DESCRIPTION OF THE PREFERRED EMBODIMENT

Figure 1:
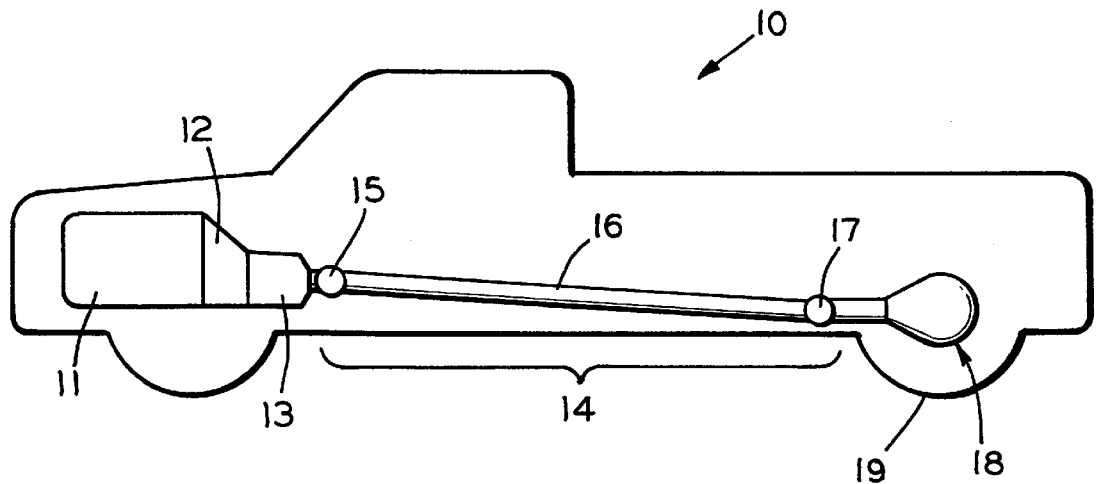
FIG. 1 is a schematic side elevational view of a vehicle including a first embodiment of a prior art drive train system.

Referring now to the drawings, there is schematically illustrated in FIG. 1 a vehicle, indicated generally at 10, including a first embodiment of a prior art drive train system. The illustrated prior art drive train system includes an engine 11, a clutch 12, and a transmission 13. As is well known, the engine 11 includes an output shaft (not shown) that is selectively connected through the clutch 12 to an input shaft (not shown) of the transmission 13. The transmission 13 provides a plurality of speed change gear ratios between the rotational speeds of the input shaft of the transmission 13 and an output shaft (not shown) thereof.

The output shaft of the transmission 13 is connected to the forward end of a driveshaft assembly 14. The illustrated driveshaft assembly 14 includes a first universal joint 15 that is connected between the output shaft of the transmission 13 and a forward end of a driveshaft tube 16. The rearward end of the driveshaft tube 16 is connected through a second universal joint 17 to an input shaft (not shown) of an axle assembly, indicated generally at 18. The axle assembly 18 includes a differential gear mechanism (not shown) that is rotatably driven by the input shaft and a pair of output axle shafts (not shown that connect the differential gear mechanism to a set of driven wheels 19 of the vehicle 10.

The driveshaft tube 16 illustrated in FIG. 1 is intended to represent a conventional steel alloy driveshaft tube having a constant diameter throughout the length thereof. The magnitude of the diameter of the driveshaft tube 16 may vary from vehicle to vehicle. For example, the diameter of the driveshaft tube 16 may be approximately three to three and one-half inches, as is common the art for light trucks and similar vehicles. As is apparent from FIG. 1, there are no components mounted on the vehicle 10 located sufficiently close to the driveshaft tube 16 to interfere with the rotation thereof during normal operation.

Figure 2:
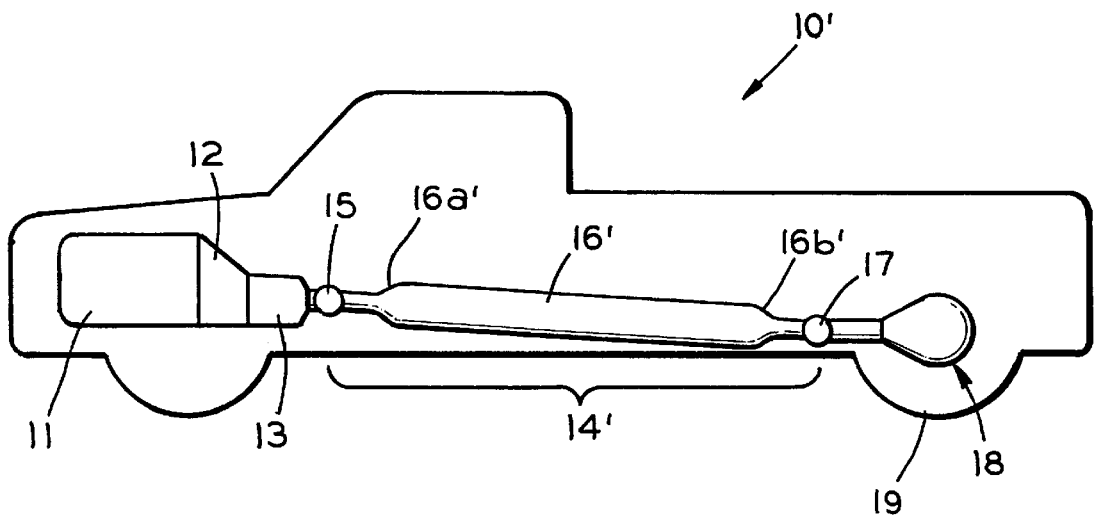
FIG. 2 is a schematic side elevational view of a vehicle including a second embodiment of a prior art drive train system.

Referring now to FIG. 2, there is schematically illustrated a vehicle, indicated generally at 10', including a second embodiment of a prior art drive train system. The second embodiment of the prior art drive train system is similar to the first embodiment described above, and like reference numbers are used to indicate similar components. The vehicle 10' has a driveshaft assembly 14' that includes a driveshaft tube 16'. The driveshaft tube 16' illustrated in FIG. 2 is intended to represent a conventional aluminum alloy driveshaft tube having an enlarged diameter throughout most of the length thereof. The illustrated driveshaft tube 16' is formed having diameter reducing portions 16a' and 16b' at the respective ends thereof that facilitate the use of conventionally sized universal joints 15 and 17. However, the driveshaft tube 16' need not be formed with such diameter reducing portion 16a' and 16b'. When provided, the diameter reducing portions 16a' and 16b' may be formed integrally with the driveshaft tube 16' or integrally with respective yokes (not shown) of the universal joints 15 and 17. The magnitude of the diameter of the driveshaft tube 16' may vary from vehicle to vehicle. If the aluminum alloy driveshaft tube 16' is intended to replace the three to three and one-half inch diameter steel alloy driveshaft tube 16 discussed above, the diameter of the aluminum alloy driveshaft tube 16' may be approximately five inches. As is apparent from FIG. 2, there are no components mounted on the vehicle 10' located sufficiently close to the driveshaft tube 16' to interfere with the rotation thereof during normal operation.

The driveshaft tube 16' illustrated in FIG. 2 has been manufactured in accordance with the following steps. First, a tube of aluminum alloy material is provided having a diameter that corresponds to the enlarged diameter of the driveshaft tube 16'. Then, the ends of the enlarged diameter tube may be reduced if desired, such as by swaging, to form the driveshaft tube 16' having the diameter reducing portions 16a' and 16b' at the respective ends thereof. The step of reducing the diameter of the end portions of the enlarged diameter tube can be accomplished with relative ease because the axial lengths of the end portions are relatively short. Therefore, dimensional changes and other undesirable variations in the geometry of the enlarged diameter tube are minimized.

Figure 3:
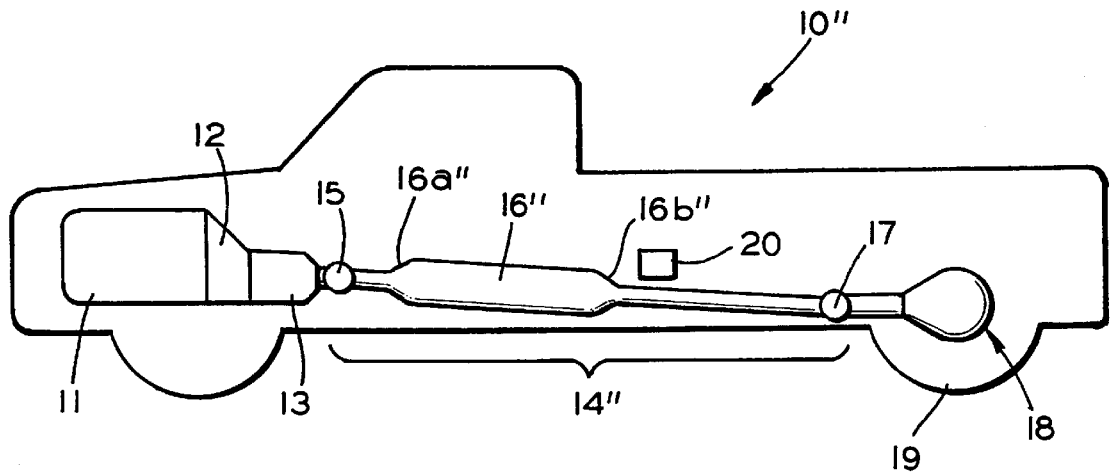
FIG. 3 is a schematic side elevational view of a vehicle including a third embodiment of a prior art drive train system.

Referring now to FIG. 3, there is schematically illustrated a vehicle, indicated generally at 10", including a third embodiment of a prior art drive train system. The third embodiment of the prior art drive train system is similar to the first and second embodiments respectively described above, and like reference numbers are used to indicate similar components. The vehicle 10" has a driveshaft assembly 14" that includes a driveshaft tube 16". The driveshaft tube 16" illustrated in FIG. 3 is intended to represent an alternative conventional aluminum alloy driveshaft tube having an enlarged diameter throughout only a portion of the length thereof. The driveshaft tube 16" may be formed having a first diameter reducing portion 16a" at one end thereof that facilitates the use of the conventionally sized universal joint 15. However, because a component 20 (such as, for example, a portion of the vehicle frame) of the vehicle 10" is located sufficiently close to the driveshaft tube 16" to interfere with the rotation thereof during normal operation, the second diameter reducing portion 16b" is located a relatively long distance from the rearward end of the driveshaft tube 16". Thus, the driveshaft tube 16" has a relatively long reduced diameter portion extending from the second diameter reducing portion 16b" to the rearward end thereof to avoid the component 20.

The driveshaft tube 16" illustrated in FIG. 3 has been manufactured in accordance with the following steps. First, a tube of aluminum alloy material is provided having a diameter that corresponds to the enlarged diameter of the driveshaft tube 16". Then, the ends of the enlarged diameter tube are reduced, such as by swaging, to form the driveshaft tube 16" having the first diameter reducing portion 16a" at one end thereof and the second diameter reducing portion 16b" at an interior portion thereof. The step of reducing the diameter of the first end portion of the enlarged diameter tube to form the first diameter reducing portion 16a" can be accomplished with relative ease because the axial length thereof is relatively short. However, the step of reducing the diameter of the second end portion of the enlarged diameter tube to form the second diameter reducing portion 16b" is difficult because the axial length thereof is relatively long. Because of this relatively long axial length, dimensional changes and other undesirable variations can be introduced into in the geometry of the enlarged diameter tube.

Figure 4:
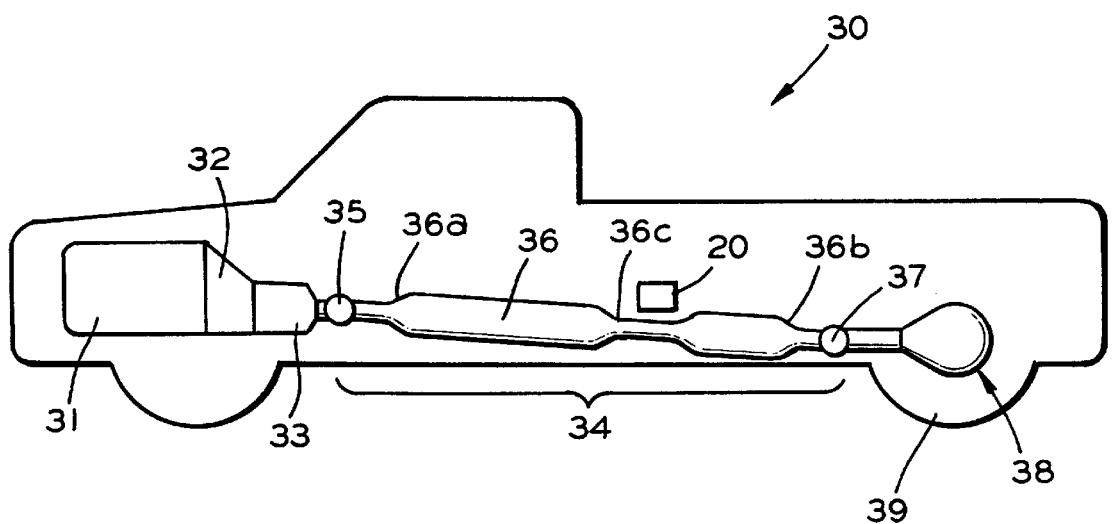
FIG. 4 is a schematic side elevational view of a vehicle including a drive train system manufactured in accordance with this invention.

Referring now to FIG. 4, there is schematically illustrated a vehicle, indicated generally at 30, including a drive train system in accordance with this invention. The drive train system of this invention includes an engine 31, a clutch 32, and a transmission 33. The engine 31 includes an output shaft (not shown) that is selectively connected through the clutch 32 to an input shaft (not shown) of the transmission 33. The transmission 33 provides a plurality of speed change gear ratios between the rotational speeds of the input shaft of the transmission 33 and an output shaft (not shown) thereof.

The output shaft of the transmission 33 is connected to the forward end of a driveshaft assembly 34. The illustrated driveshaft assembly 34 includes a first universal joint 35 that is connected between the output shaft of the transmission 33 and a forward end of a driveshaft tube 36. The rearward end of the driveshaft tube 36 is connected through a second universal joint 37 to an input shaft (not shown) of an axle assembly, indicated generally at 38. The axle assembly 38 includes a differential gear mechanism (not shown) that is rotatably driven by the input shaft and a pair of output axle shafts (not shown that connect the differential gear mechanism to a set of driven wheels 39 of the vehicle 30.

The driveshaft tube 36 illustrated in FIG. 4 is formed from an aluminum alloy material and has an enlarged diameter throughout most of the length thereof. The illustrated driveshaft tube 36 is formed having a first diameter reducing portion 36a at one end thereof that facilitates the use of the conventionally sized first universal joint 35. Similarly, the illustrated driveshaft tube 36 is formed having a second diameter reducing portion 36b at the other end thereof that facilitates the use of the conventionally sized first universal joint 37. However, the driveshaft tube 36 may be formed without the diameter reducing portions 36a and 36b if desired. Because the component 20 of the vehicle 30 is located sufficiently close to the driveshaft tube 36 to interfere with the rotation thereof during normal operation, an interior reduced diameter portion 36c is formed in the driveshaft tube 36. The interior reduced diameter portion 36c can be formed by any conventional process. Known metal working processes that could be adapted to form the interior reduced diameter portion 36c include hydroforming, electromagnetic pulse deformation, and mechanical rolling processes. One preferred mechanical rolling process is spinning, which uses a rotating wheel to push against a tube mounted in a lathe or other suitable device to form regions of smaller diameter. The wheel is programmable to follow a specific path such that it can be moved inward at the locations where the reduced diameter is desired. The range of motion of the wheel is variable so that the transition areas between the original diameter and the reduced diameter can be either gradual or severe. Typically, this spinning method is performed at room temperature, although such is not necessary.

The interior reduced diameter portion 36c has an axial length that is preferably only slightly longer than the axial length of the component 20 posing the obstruction. In this manner, the amount of the aluminum alloy material that must be moved during the diameter reducing process is minimized. This, in turn, minimizes the amount of dimensional changes and other undesirable variations in the geometry of the enlarged diameter tube that occur during the diameter reducing process. Preferably, the axial length of the interior reduced diameter portion 36c is no longer than approximately 20% of the total axial length of the driveshaft tube 36. For example, if the driveshaft tube 36 has an axial length of approximately seventy-two inches (1832 mm), the axial length of the interior reduced diameter portion 36c is preferably no longer than approximately fourteen inches (366 mm).

The amount by which the diameter of the driveshaft tube 36 is reduced in the interior reduced diameter portion 36 can be varied as necessary to accommodate the component 20 of the vehicle 30. Preferably, the smaller diameter of the interior reduced diameter portion 36 is in the range of from about 60% to about 95% of the diameter of the remainder of the enlarged driveshaft tube 36. For example, if the diameter of the enlarged driveshaft tube 36 is approximately five inches (127 mm), the smaller diameter of the interior reduced diameter portion 36 can be approximately four and one-half inches (114 mm). Also, more than one of the interior reduced diameter portions 36 can be formed in the driveshaft tube 36 if necessary to accommodate a plurality of such interfering components 20.

Figure 5:
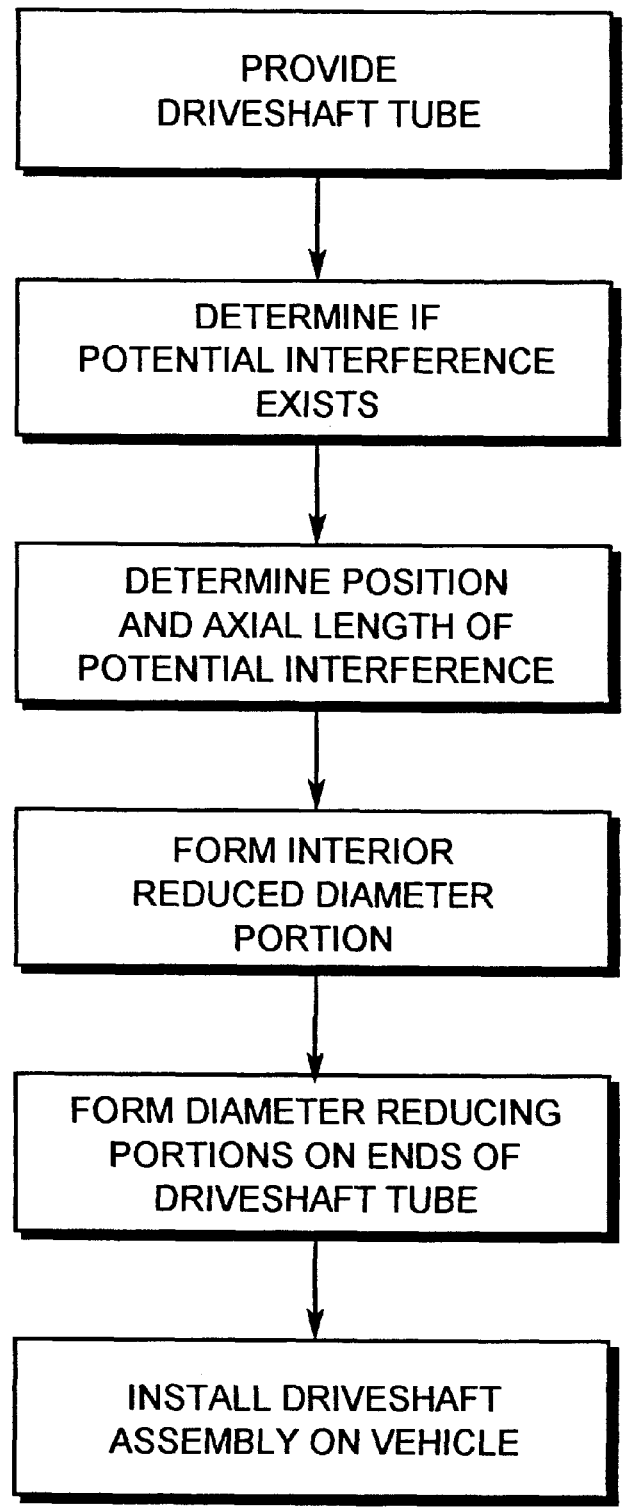
FIG. 5 is a flow chart of the steps of manufacturing the driveshaft tube illustrated in FIG. 4.

The driveshaft tube 36 illustrated in FIG. 4 can be manufactured in accordance with the following steps, as shown in FIG. 5. First, a tube of aluminum alloy material is provided having a diameter that corresponds to the enlarged diameter of the driveshaft tube 36. Then, a determination is made as to whether any component 20 of the vehicle 30 is located sufficiently close to the driveshaft tube 36 to interfere with the rotation thereof during normal operation. If so, the position and axial length of the potential interference is located on the aluminum alloy tube. A diameter reducing process is then performed on the aluminum alloy tube to form the interior reduced diameter portion 36c to eliminate the potential interference. Next, the ends of the enlarged diameter tube may be reduced if desired, such as by swaging, to form the driveshaft tube 36 having the first and second diameter reducing portions 36a and 36b at the ends thereof. If desired, the step of forming the first and second diameter reducing portions 36a and 36b can precede or occur simultaneously with the step of forming the interior reduced diameter portion 36c. To complete the method of this invention, yokes are secured to the reduced diameter end portions of the driveshaft tube 36, and the driveshaft tube 36 is installed in the drive train system of the vehicle 30.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for forming a driveshaft tube for a drive train system of a vehicle including a component, said method comprising the steps of:
   (a) providing a tube having a diameter that corresponds to the diameter of the driveshaft tube to be formed;
   (b) determining whether the component of the vehicle is located sufficiently close to the driveshaft tube to potentially interfere with the diameter thereof;
   (c) determining the position and axial length of potential interference; and
   (d) performing a diameter reducing process on a limited portion of the driveshaft tube that corresponds substantially to the axial length of the potential interference to form an interior reduced diameter portion that eliminates the potential interference, said diameter reducing process not being performed on the ends of the driveshaft tube.

2. The method defined in claim 1 wherein said step (a) is performed by providing a tube formed from an aluminum alloy material.

3. The method defined in claim 1 wherein said step (d) is performed by spinning.

4. The method defined in claim 1 wherein said step (d) is performed by hydroforming.

5. The method defined in claim 1 wherein said step (d) is performed by electromagnetic pulse deformation.

6. The method defined in claim 1 wherein said step (d) is performed by mechanical rolling.

7. The method defined in claim 1 including the further step of providing a diameter reducing portion at one end of the tube.

8. The method defined in claim 1 including the further step of providing a diameter reducing portion at each end of the tube.

9. The method defined in claim 1 wherein the interior reduced diameter portion has a length of no more than 20% of a total axial length of the driveshaft tube.

10. The method defined in claim 1 wherein the diameter of the interior reduced portion is in a range of from about 60% to about 95% of the diameter of the driveshaft tube.

* * * * *